US009164689B2

(12) United States Patent
O'Brien et al.

(10) Patent No.: US 9,164,689 B2
(45) Date of Patent: Oct. 20, 2015

(54) DATA STORAGE SYSTEM AND METHOD OF PROCESSING A DATA ACCESS REQUEST

(75) Inventors: John Timothy O'Brien, Louisville, CO (US); Michael Steven Milillo, Louisville, CO (US); George Franklin DeTar, Jr., Longmont, CO (US); Carl Thomas Madison, Jr., Windsor, CO (US)

(73) Assignee: Oracle America, Inc., Redwood City, CA (US)

( * ) Notice: Subject to any disclaimer, the term of this patent is extended or adjusted under 35 U.S.C. 154(b) by 1568 days.

(21) Appl. No.: 12/414,084

(22) Filed: Mar. 30, 2009

(65) Prior Publication Data

US 2010/0250700 A1    Sep. 30, 2010

(51) Int. Cl.
  G06F 15/16    (2006.01)
  G06F 15/167   (2006.01)
  G06F 15/173   (2006.01)
  G06F 13/00    (2006.01)
  G06F 3/06     (2006.01)

(52) U.S. Cl.
  CPC .............. G06F 3/0643 (2013.01); G06F 3/067 (2013.01); G06F 3/0611 (2013.01); G06F 3/0635 (2013.01); G06F 3/0688 (2013.01)

(58) Field of Classification Search
  USPC ......... 709/203, 208, 211, 212, 213, 214, 216, 709/217, 223, 230; 711/100, 111, 112, 114
  See application file for complete search history.

(56) References Cited

U.S. PATENT DOCUMENTS 5,504,873 A * 4/1996 Martin et al. ................. 711/111
5,987,506 A * 11/1999 Carter et al. .................. 709/213
2002/0002611 A1 * 1/2002 Vange .......................... 709/223
2005/0192932 A1    9/2005 Kazar et al.
2007/0226328 A1    9/2007 Kusama et al.
2008/0059718 A1    3/2008 Tajima et al.

(Continued)

FOREIGN PATENT DOCUMENTS

JP    H05-40582      2/1993
JP    H05-40582 A    2/1993
JP    2005-165852    6/2005

(Continued)

OTHER PUBLICATIONS

Huffman, Amber; Non-Volatile Memory Host Controller Interface (NVMHCI) 1.0, Copyright 2007-2008, Intel Corporation, pp. 1-65.

(Continued)

*Primary Examiner* — Ninos Donabed
*Assistant Examiner* — Farrukh Hussain
(74) *Attorney, Agent, or Firm* — Brooks Kushman P.C.

(57) ABSTRACT

A data storage system includes a plurality of servers, a plurality of external interface providers each deployed on one of the servers, and a plurality of data storage controllers each deployed on one of the servers. Each of the providers is configured to receive a data access request, to identify one of the controllers that can satisfy the request, and to forward the request to the identified controller. The system further includes a plurality of data storage modules independent of the servers. The providers, controllers and modules are in communication with each other. Each of the controllers exclusively manages a portion of data content in at least one of the modules, and satisfies data access requests received from the providers by accessing the portion of data content in the at least one module.

18 Claims, 3 Drawing Sheets

(56) References Cited

U.S. PATENT DOCUMENTS

| | | |
|---|---|---|
| 2009/0006792 A1 | 1/2009 | Federwisch et al. |
| 2010/0005151 A1* | 1/2010 | Gokhale .................. 709/216 |

FOREIGN PATENT DOCUMENTS

| | | |
|---|---|---|
| JP | 2005165852 A | 6/2005 |
| JP | 2005-202893 | 7/2005 |
| JP | 2005202893 A | 7/2005 |
| JP | 2007180610 A | 7/2007 |
| JP | 2007-233783 | 9/2007 |
| JP | 2007-233783 A | 9/2007 |
| JP | 2007-310673 | 11/2007 |
| JP | 2007-323557 | 12/2007 |
| JP | 2007-323557 A | 12/2007 |
| JP | 2008-059438 | 3/2008 |
| JP | 2008-59438 | 3/2008 |
| JP | 2008-539505 | 11/2008 |
| WO | WO2006/118592 A | 11/2006 |

OTHER PUBLICATIONS

International Search Report dated Aug. 4, 2010 from the corresponding International Application No. PCT/US2010/029116, pp. 1-13.
Roger Bitar, Deploying Hybrid Storage Pools, Sun Microsystems, Sun BluePrints Online, Oct. 31, 2008, pp. 1-16.

* cited by examiner

DATA STORAGE SYSTEM AND METHOD OF PROCESSING A DATA ACCESS REQUEST

BACKGROUND

Copy-on-write ("COW") is an optimization strategy used in computer programming. Multiple requesters of resources that are initially indistinguishable are given pointers to the same resource. This strategy is maintained until a requestor attempts to modify its copy of the resource. A private copy is then created to prevent any changes from becoming visible to the other requesters. The creation of such private copies is transparent to the requesters. No private copy is created if a requestor does not attempt to modify its copy of the resource.

Virtual memory operating systems may use COW. If a process creates a copy of itself, pages in memory that may be modified by the process (or its copy) are marked COW. If one process modifies the memory, the operating system's kernel may intercept the operation and copy the memory so that changes in one process's memory are not visible to the other.

COW may also be used in the calloc function provided in the C and C++ standard libraries for performing dynamic memory allocation. A page of physical memory, for example, may be filled with zeroes. If the memory is allocated, the pages returned may all refer to the page of zeroes and may be marked as COW. As such, the amount of physical memory allocated for a process does not increase until data is written.

A memory management unit (MMU) may be instructed to treat certain pages in an address space of a process as read-only in order to implement COW. If data is written to these pages, the MMU may raise an exception to be handled by a kernel. The kernel may then allocate new space in physical memory and make the page being written correspond to that new location in physical memory.

COW may permit efficient use of memory. Physical memory usage only increases as data is stored in it.

Outside a kernel, COW may be used in library, application and system code. For example, the string class provided by the C++ standard library allows COW implementations. COW may also be used in virtualization/emulation software such as Bochs, QEMU and UML for virtual disk storage. This may (i) reduce required disk space as multiple virtual machines (VMs) may be based on the same hard disk image and (ii) increase performance as disk reads may be cached in RAM and subsequent reads served to other VMs outside of the cache.

COW may be used in the maintenance of instant snapshots on database servers. Instant snapshots preserve a static view of a database by storing a pre-modification copy of data when underlying data are updated. Instant snapshots are used for testing or moment-dependent reports. COW may also be used as the underlying mechanism for snapshots provided by logical volume management.

COW may be used to emulate a read-write storage on media that require wear leveling or are physically Write Once Read Many.

ZFS is a file system designed by Sun Microsystems for the Solaris Operating System. The features of ZFS may include support for high storage capacity, integration of the concepts of file system and volume management, snapshots and COW clones, on-line integrity checking and repair, and RAID-Z.

Unlike traditional file systems, which may reside on single devices and thus require a volume manager to use more than one device, ZFS file systems are built on top of virtual storage pools referred to as zpools. A zpool is constructed of virtual devices (vdevs), which are themselves constructed of block devices: files, hard drive partitions or entire drives.

Block devices within a vdev may be configured in different ways, depending on need and space available: non-redundantly (similar to RAID 0), as a mirror (RAID 1) of two or more devices, as a RAID-Z (similar to RAID 5 with regard to parity) group of three or more devices, or as a RAID-Z2 (similar to RAID 6 with regard to parity) group of four or more devices. The storage capacity of all vdevs may be available to all of the file system instances in the zpool.

ZFS uses a COW transactional object model. All block pointers within the file system may contain a 256-bit checksum of the target block which is verified when the block is read. Blocks containing active data are not overwritten in place. Instead, a new block is allocated, modified data is written to it and then any metadata blocks referencing it are similarly read, reallocated and written. To reduce the overhead of this process, multiple updates may be grouped into transaction groups. An intent log may be used when synchronous write semantics are required.

If ZFS writes new data, the blocks containing the old data may be retained, allowing a snapshot version of the file system to be maintained. ZFS snapshots may be created quickly, since all the data composing the snapshot is already stored. They may also be space efficient, since any unchanged data is shared among the file system and its snapshots.

Writeable snapshots ("clones") may also be created, resulting in two independent file systems that share a set of blocks. As changes are made to any of the clone file systems, new data blocks may be created to reflect those changes. Any unchanged blocks continue to be shared, no matter how many clones exist.

ZFS employs dynamic striping across all devices to maximize throughput. As additional devices are added to the zpool, the stripe width automatically expands to include them. Thus all disks in a pool are used, which balances the write load across them.

ZFS uses variable-sized blocks of up to 128 kilobytes. Currently available code allows an administrator to tune the maximum block size used as certain workloads may not perform well with large blocks.

If data compression is enabled, variable block sizes are used. If a block can be compressed to fit into a smaller block size, the smaller size is used on the disk to use less storage and improve I/O throughput (though at the cost of increased CPU use for the compression and decompression operations).

In ZFS, file system manipulation within a storage pool may be less complex than volume manipulation within a traditional file system. For example, the time and effort required to create or resize a ZFS file system is closer to that of making a new directory than it is to volume manipulation in some other systems

SUMMARY

A data storage system includes a plurality of servers, a plurality of external interface providers each deployed on one of the servers, and a plurality of data storage controllers each deployed on one of the servers. Each of the providers is configured to receive a data access request, to identify one of the controllers that can satisfy the request, and to forward the request to the identified controller. The system further includes a plurality of data storage modules independent of the servers. The providers, controllers and modules are in communication with each other. Each of the controllers exclusively manages a portion of data content in at least one of the modules, and satisfies data access requests received from the providers by accessing the portion of data content in the at least one module.

A method of processing a data access request includes, at an external interface provider deployed on a server, receiving a data access request, identifying a data storage controller deployed on another server that can satisfy the request, and forwarding the request to the identified controller. The identified controller exclusively manages a portion of data content in at least one data storage module independent of the servers. The method further includes, at the identified controller, receiving the forwarded request, and accessing, in response to the received request, the portion of data content in the at least one module to satisfy the request.

A data storage system includes a plurality of servers, a plurality of external interface providers each deployed on one of the servers, and a plurality of data storage controllers each deployed on one of the servers. Each of the providers is configured to receive a data access request, to identify one of the controllers that can service the request, and to route the request to the identified controller. The system further includes a plurality of data storage modules independent of the servers. At least one of the modules is configured to buffer data contained in write data access requests to provide non-volatile storage of the data. At least another one of the modules has a capacity substantially greater than the at least one module. The providers, controllers and modules are in communication with each other as peers via a remote direct memory access protocol. Each of the controllers is configured to exclusively manage a portion of data content in at least one of the modules, to receive data access requests from the providers, and to access the portion of data content in the at least one module in response to receiving the requests to service the requests.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
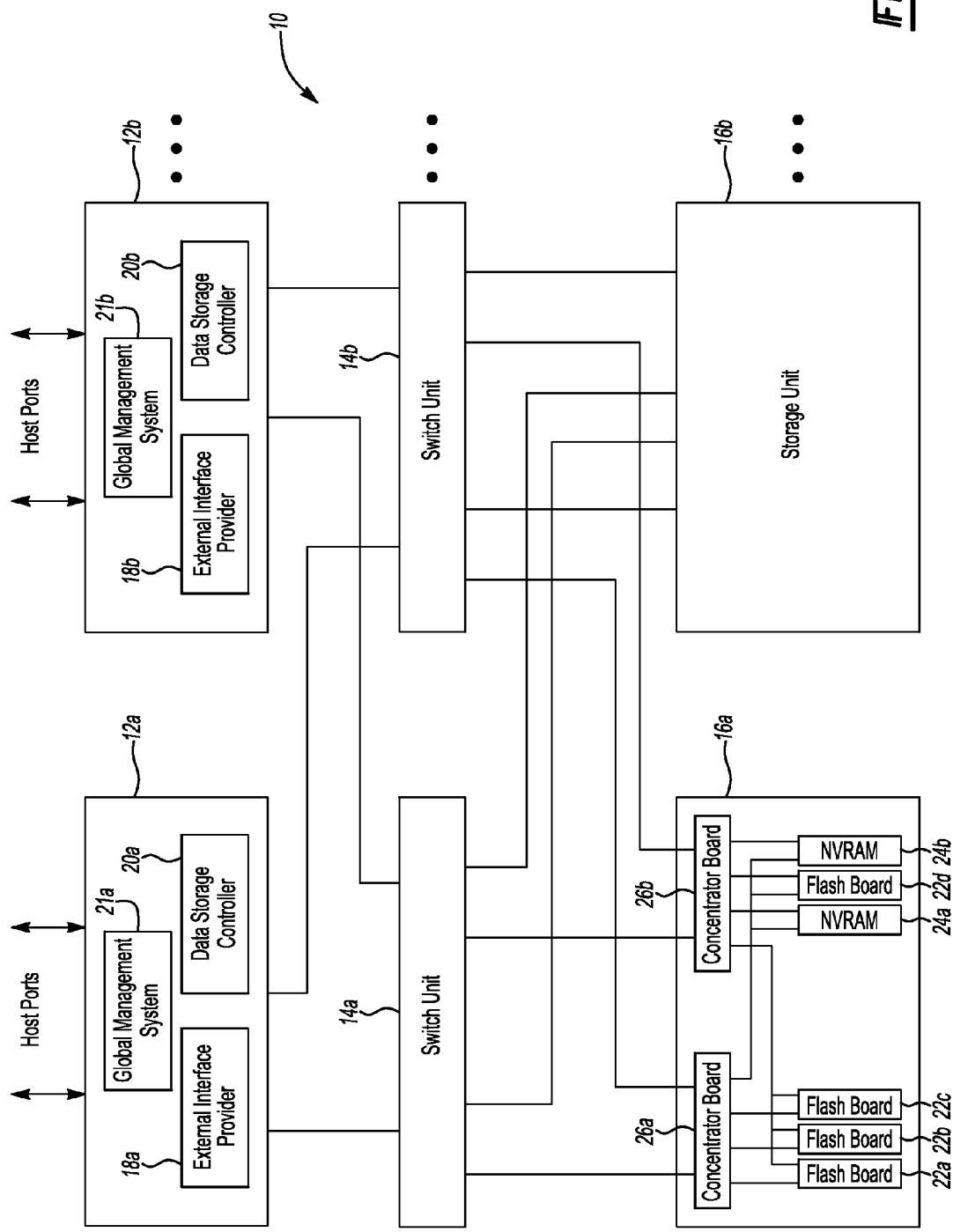
FIG. 1 is a block diagram of an embodiment of a storage system.

The performance of storage arrays may be limited by several factors including the mechanical latencies of magnetic disk drives, the cost and volatility of semiconductor memories, and centralized architectures with inherent limitations to scaling of performance, capacity and interconnect.

Non-volatile semiconductor memory technology, e.g., NAND Flash, may supplant magnetic disk in applications where performance and power take precedence over raw capacity and cost per bit. Existing implementations of this technology have mimicked those of magnetic disk by using the same command sets, same communications protocols, and often the same physical dimensions as magnetic drives. Certain embodiments disclosed herein, however, spring from the premise that the benefits of Flash technology, e.g. no mechanical latency, parallel access, and the mitigation of its disadvantages, e.g. erase before write, write cycle wear-out limitations, may not be achieved with partitioning and interconnect schemes designed for magnetic disk.

Existing high performance storage platforms rely on centralized, shared control and semiconductor cache. This design choice mitigates the latencies of magnetic disk and the low bandwidths of interconnect technologies available at the time their architectures were defined. This design choice, however, may result in a compromise between the cost of an entry level system and the maximum size and performance that may be achieved.

By making use of NAND Flash and modern low latency/high bandwidth interconnect standards within the context of a high-performance computer and suitable file system technology, some embodiments disclosed herein may have the potential for industry leading small-block input/output operations per second (IOPS), total IOPS per storage system, cost per IOPS, floor space per IOPS, and power per IOPS.

Many transaction processing and data base systems generate small-block, random data access requests at a very high rate. This rate grows as the semiconductor technology of the processor running these applications improves. Disk capacities and instantaneous data rates continue to increase, but the mechanical seek and rotational latency delays remain relatively constant, leading to a slow growth in the number of disk IOPS. This may create the need for employing ever larger and more expensive disk systems. A system, however, that provides a higher access density than can be achieved with disk drives may be a suitable alternative. Flash memory supports a higher I/O rate per GB of storage (or a higher-access density) than disk. Flash memory may also provide lower cost per GB of storage than RAM technologies. Certain embodiments disclosed herein may capitalize on these attributes and thus may deliver a scalable and cost effective storage system that provides the enterprise class reliability, availability and serviceability desired.

Traditional disk drives may be replaced with Solid-State Disks (SSDs) to take advantage of Flash memory technology. This may yield an improvement in I/O rate. These high-speed SSDs, however, may expose system bottlenecks that are currently hidden by the low I/O rates of disk drives. The disk command protocol stack overhead in the controller and the disk command/status processing time in the SSD may dwarf the data transfer time for small-block transfers. Disk command protocols may also hide data usage information from the Flash controller, and hide wear out and failure information from the control unit.

Disk access hardware and disk drive interconnect may be replaced with Flash memory hardware that is located within the disk controller, near the controller's cache. High performance designs may put the Flash memory within the controller. This may limit the amount of Flash storage. Regardless of the location of the Flash memory, traditional disk management processes do not appear to address the unique requirements of Flash memory. With static mapping of host disk addresses to real "disk drives" (Flash storage), hot spots in the host's write access patterns may lead to premature wear out of the associated Flash storage. Small random writes to Flash storage may force the Flash controller to move pages of data around to free an entire Flash block-the smallest portion of the Flash memory that can be erased. This may impact performance and reduce lifetime.

Certain embodiments disclosed herein may avoid at least some of the system bottlenecks of current disk based architectures, and produce a scalable storage system whose performance and value approach the limits of the underlying Flash technology. These embodiments may include:

(i) Multiple independent ZFS instances, each of which may be responsible for the management of a portion of the overall capacity. ZFS instances may be spread across a pool of servers that also contain the host interface ports.

(ii) Redirection of each I/O request from the receiving port to the ZFS instance(s) responsible for the blocks requested. In an example case, this is a redirection from the host port on one I/0 server to a ZFS instance on another I/O server. This redirection stage may allow any part of the capacity to be reached from any port. The ZFS instance may then issue the necessary direct transactions to Flash and/or non-volatile RAM (NVRAM) to complete the request. Acknowledgements or data may then be forwarded back to the host through the originating port.

(iii) A low latency, memory mapped network that may tie together, for example, front end ports, ZFS instances, NVRAM and Flash. This network may be implemented with InfiniBand among servers, and between servers and storage units, and with PCI Express internal to the I/O servers and storage units. The servers and storage units may communicate as peers. The redirection traffic and ZFS/memory traffic may both use the same fabric.

(iv) One or more storage units may contain, for example, both Flash and NVRAM. These storage units may be designed for high availability with hot swapping and internal redundancy of memory cards, power, cooling and interconnect. An InfiniBand external interconnect may be translated to two independent PCI Express trees by two concentrator boards. The system may thus have rapid access to Flash as well as the NVRAM. The RAM may be made non-volatile by backing it up to dedicated Flash on loss of power. The mix of Flash and NVRAM cards may be configurable-both may use the same connector and board profile.

(v) A global management facility (data storage system manager) that may supervise the operation of the storage system in a pseudo-static, "low touch" approach, intervening when capacity must be reallocated between ZFS instances, for global Flash wear leveling, for configuration changes, and for failure recovery.

The "divide and conquer" strategy of dividing the capacity among individual ZFS instances may enable a high degree of scalability of performance, connectivity and capacity. Additional performance may be achieved by horizontally adding more servers and then assigning less capacity per ZFS instance and/or fewer ZFS instances per server. Performance may also be scaled vertically by choosing faster servers. Host ports may be added by filling available slots in servers and then adding additional servers. Additional capacity may be achieved by adding additional storage units, and allocating the new capacity to ZFS instances.

Referring now to FIG. 1, a storage system 10 may include a plurality of I/O servers 12$n$ (12$a$, 12$b$, etc.), e.g., blade or standalone servers, a plurality of switch units 14$n$ (14$a$, 14$b$, etc.), e.g., InfiniBand expandable switch units, and one or more storage units 16$n$ (16$a$, 16$b$, etc.). Other suitable configurations are also possible. An external interface provider 18$n$ (18$a$, 18$b$, etc.), data storage controller 20$n$ (20$a$, 20$b$, etc.), and global management system (data storage system manager) 21$n$ (21$a$, 21$b$, etc.) may be deployed on each of the servers 12$n$. (The providers 18$n$ and the controllers 20$n$ may, of course, be implemented in hardware and/or software.)

The storage units 16$n$ of FIG. 1 may include, for example, a plurality of Flash boards 22$n$ (22$a$, 22$b$, etc.) and NVRAM boards 24$n$ (24$a$, 24$b$) connected to concentrator boards 26$n$ (26$a$, 26$b$) via, for example, PCI Express. Each of the storage units 16$n$ may be an integral rack-mounted unit with its own internally redundant power supply and cooling system. Active components such as memory boards, concentrator boards, power supplies and cooling may be hot swappable.

In the embodiment of FIG. 1, the providers 18$n$, controllers 20$n$ and boards 22$n$, 24$n$ may communicate as peers via a Remote Direct Memory Access (RDMA) protocol conveyed through the switch units 14$n$. An I/O server, for example, I/O server 12$a$, may communicate with the boards 22$n$, 24$n$ using this RDMA protocol. In addition, each of the I/O servers 12$n$ may communicate with all of the other I/O servers 12$n$ using the RDMA protocol. Any suitable communication scheme, however, may be used.

The providers 18$n$ are each capable of receiving (read or write) data access requests, identifying, via a mapping for example, the controller 20$x$ that can service the request (which may be deployed on a different server), and routing the request to the identified controller 20$x$.

The controllers 20$n$ each exclusively manage a portion of data content in at least one of the boards 22$n$, 24$n$, and may satisfy data access requests received from the providers 18$n$ by accessing their data content.

Figure 2:
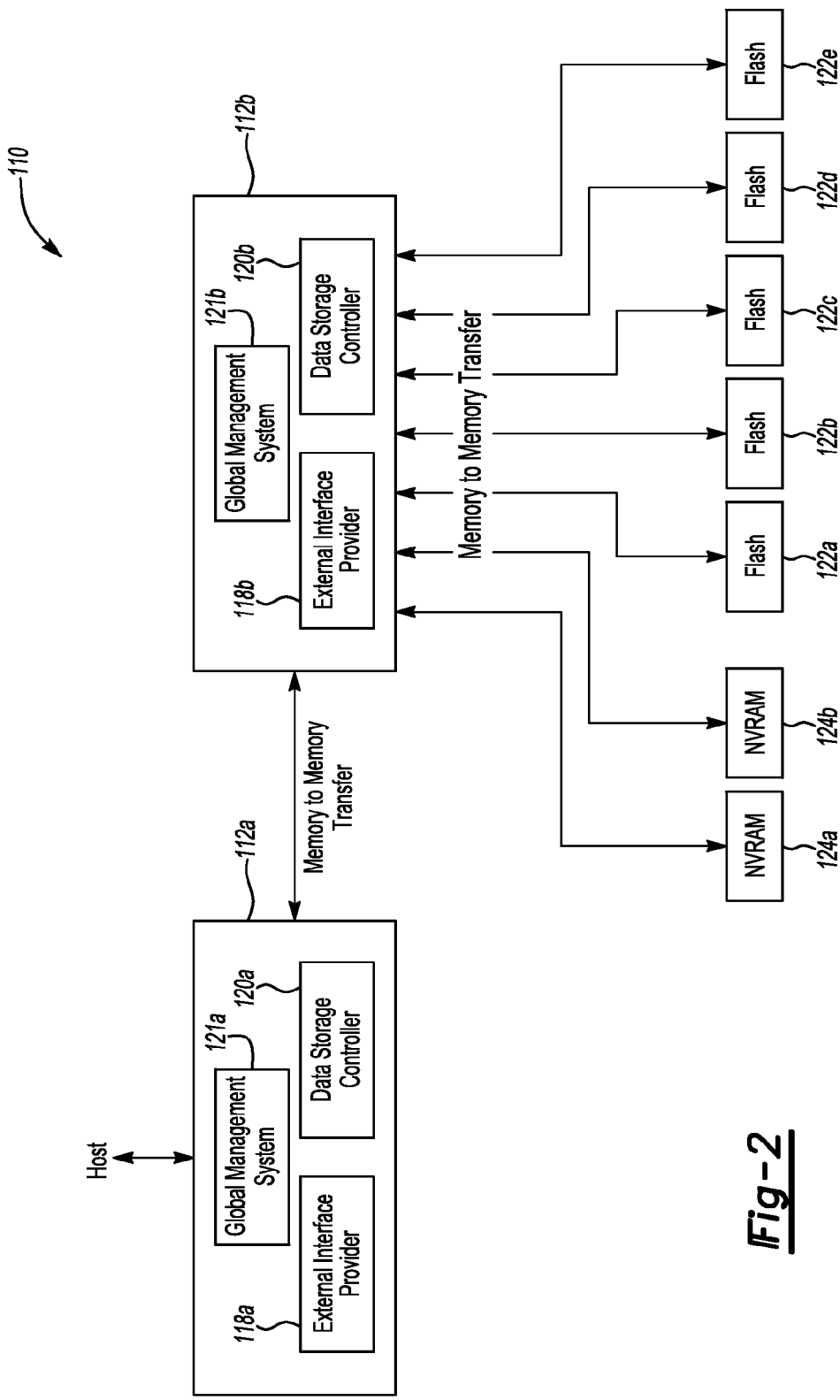
FIG. 2 is a block diagram depicting data flow in another embodiment of a storage system.

Referring now to FIG. 2 where elements having like numerals have similar descriptions to FIG. 1, the external interface provider 118$a$ may receive a data access request from a host. The provider 118$a$ may identify, via a mapping, etc., the controller 120$x$ (which, in this example, is deployed on the server 112$b$) that can satisfy the request. The provider 118$a$ may then redirect the request to the identified controller 120$b$. The identified controller 120$b$ may receive the redirected request, and then access, in response, data in any of the boards 122$n$, 124$n$ that may satisfy the request. (Although the use of Flash memory for data storage modules has been discussed in detail, other memory technologies, including magnetic disk, may also be used.)

In certain embodiments:

(i) Two or more servers may provide fault tolerance. If one server fails, another server may take over the work that was being performed by the failed server. Likewise, two or more data storage modules may provide fault tolerance.

(ii) NVRAM boards may provide access to data more quickly (lower access latency) than Flash memory boards, though at the cost of providing lower capacity (and thus higher cost per bit of storage).

(iii) Servers may provide one or more of the following services: host interfacing, routing data access requests to the appropriate server, handling data access requests, managing data stored in a set of data storage modules and/or non-volatile memory cards, managing the assignment of data and storage space to individual servers, and migrating data from one server to another for global wear leveling, to better balance the workload, or to handle system configuration changes, component wear-out or component failure and replacement.

(iv) The servers and storage (e.g., data storage modules and/or non-volatile memory cards) may communicate with each other over an interconnect fabric that allows server-to-server, server-to-storage, and/or storage-to-storage communications.

(v) The process of routing all I/O access requests for a particular block of data to the server that is responsible for storing that block of data may provide a consistent view of the stored data across all of the host interfaces without requiring server-to-server synchronization on each host I/O request.

(vi) The data storage module interfaces may be divided into separate sets, with each set used by only one server. This partitioning of the interfaces may eliminate the need for two or more servers to share a single interface and may eliminate the need for the servers to coordinate their use of a single interface. A single data storage module may provide one interface or multiple interfaces.

(vii) The data storage in each non-volatile memory card may be subdivided into separate regions with a single server having exclusive use of a region. This may allow multiple servers to store data within a single non-volatile memory card without having to coordinate their use of the storage space provided by the non-volatile memory card.

(viii) The process of managing data stored on the data storage modules and/or non-volatile memory cards may include repositioning updated data that is written to the data storage modules and maintaining mapping information that identifies the location of the most recently written instance of each data block. This process may distribute write activity across the storage space within each data storage module and distribute write activity across multiple data storage modules. This distribution of the write activity may provide wear leveling, which may be important for Flash memory devices in which data storage cells wear out after being erased and programmed repeatedly.

(ix) The interconnect fabric may employ a memory block transfer protocol, e.g., InfiniBand and/or PCI Express, rather than a disk command protocol. This may be beneficial for accesses to the non-volatile memory cards because it eliminates the overhead of the disk command protocol stack both in the server and in the non-volatile memory card. The data storage modules may use a RDMA protocol to make efficient use of the memory block transfer protocol interconnect and to give the data storage modules the flexibility of scheduling data transfer activities in an order that best suits the needs of the storage medium.

Flash-based storage may address the need for high access density by eliminating the mechanical delays of disk and by keeping a large number of Flash chips active at the same time. This may yield dramatically higher I/O rates per GB of storage compared to disk. Accessing Flash storage over a low-latency interconnect fabric using a low-overhead memory access protocol, and providing multiple Flash controllers per Flash storage unit may maximize the number of Flash chips being accessed in parallel-yielding even higher access density than high-capacity SSDs.

Coordinating the use of shared resources may add overhead to the process of carrying out an I/O request. Overhead that may be small in relation to disk access times may become quite significant when compared to Flash access times. In systems that share access to a central cache, to various data paths, and to disk interfaces, coordinating the use of these and other shared resources may require locking and serialized execution. This may add delay to critical timing paths in the controller, and these delays may increase as the size of the system increases and the level of resource utilization goes up. To eliminate these coordination delays from the critical timing paths, certain controller architectures disclosed herein may use multiple, independent servers running independent instances of ZFS. The system's storage is spread across these ZFS instances so that each ZFS instance has sole responsibility for managing its cache and its assigned portion of the Flash storage. The servers may then route each (host) access request to the appropriate instance of ZFS, and route the resulting data and completion status from this ZFS instance back to the originating host port. This assignment of storage and workload to ZFS instances may remain static over the time period of, for example, millions of I/O operations. Occasionally, the global management service running on the servers may move data and workload from one ZFS instance to another when necessary, for example, for wear leveling or load balancing.

The servers may need to be able to quickly commit small-block write traffic to storage that is fault-tolerant and that preserves data across a power failure. The NVRAM modules in the Flash storage units may appear to the servers to be word-writable memory. Mirrored writes to these NVRAM modules may provide the fastest means of committing small-block write transactions so that the controllers can report to the host that the write operation has been completed.

After many program/erase cycles, Flash memory cells may wear out-losing their ability to retain the data stored in the cell. To prevent premature wear out due to frequently writing portions of the Flash memory, embodiments of the storage system may employ a wear leveling strategy. This may require dynamic mapping of host disk addresses to Flash memory locations. (A single, large map, for example, that translates disk addresses to Flash memory pages may not scale well.) These embodiments may, for example, employ three wear leveling strategies that work at different levels in the Flash management hierarchy. As an example, each ZFS instance may use COW so that it can write complete RAID stripes, which automatically balances write traffic over the regions of Flash storage owned by that ZFS instance. Closer to the Flash chips, each Flash memory controller may perform wear leveling for the Flash chips that it controls, managing its own small mapping table. If certain embodiments were to allow a long-term imbalance in the write activity handled by the instances of ZFS, the Flash storage owned by the most active ZFS instances may wear out too soon. To prevent this, the system's global management services may migrate frequently written data from one instance of ZFS to another, leading to global write balancing. The performance and scalability advantages of using separate pools of Flash storage managed by multiple, independent ZFS instances may outweigh the occasional overhead of data migration.

Flash memory cells may be subject to soft errors. Flash chips may provide extra cells in which the Flash controller stores an error correction code that remedies the most frequent error cases. Each ZFS instance may spread its data across multiple Flash storage boards so that it can recover data that is lost due to an uncorrectable error, the failure of a Flash chip, or the replacement of an entire Flash storage board. To allow many instances of ZFS to run in parallel, each ZFS instance may access and be responsible for managing only a portion of the storage in any one Flash storage board. This may lead to the requirement that each Flash storage board provide multiple independent access controls so that the ZFS instances do not have to spend time coordinating their accesses.

As discussed above, the write activity generated by hosts attached to certain embodiments of the data storage system may be unevenly distributed across all of the data held by the storage system. Some portions of the data assigned to one instance of ZFS may be written far more frequently than the rest of the data managed by the other ZFS instances. This may lead to premature wear out of the Flash storage being managed by that ZFS instance.

Wear leveling may be generally practiced within SSDs. In data storage systems that employ SSDs, this wear leveling may not address imbalances in write activity between SSDs, especially when the storage system uses a static mapping of host data addresses to SSDs addresses or when the SSDs are managed by independent file systems. This may lead to some SSDs in a large storage system wearing out long before other SSDs in the system.

In distributed data storage systems such as Lustre, the assignment of a portion of the host address space to a computer within the data storage system may be done statically.

There are no provisions for moving data from one computer to another without disrupting the host's ability to access the data. In certain embodiments disclosed herein, the global management system may gather usage information such as data storage wear rate, skew of the work load distribution (the degree to which the load distribution is balanced-the lower the skew, the more uniform the load balancing, the higher the skew, the less uniform the load balancing, etc.), write activity, and remaining lifetime from the independent file systems within the data storage system. It may then use this information to determine when to move data from one file system to another and what data to move. It may also use this information to dynamically adjust a configuration of the data storage system to control the data storage wear rate and skew of the work load distribution.

Embodiments of the global management system may determine, for example, the initial placement of data when the system configuration is first defined. It may then respond to configuration changes, either due to adding or removing storage system components, or due to the failure and replacement of components, by assigning new data storage to the file systems and/or storage units, removing unused data storage from the file systems and/or storage units, or moving data from one file system and/or storage unit to another (or within a storage unit). Some embodiments of the global management system may be implemented as hardware, or software and hardware that executes on one or more of the servers/computers within the data storage system.

Embodiments of the global management system may carry out one or more of the following activities: divide the host-access address space of the storage system into partitions and assign partitions to individual file system instances; divide the data storage space within the system into partitions and assign partitions to individual file systems so as to yield good system performance, and to limit the performance impact and risk of data loss due to failures of the data storage devices or other failures (within the data storage system or external to the data storage system); distribute a map describing which portions of the system's address space are assigned to each file system instance so that data access requests can be routed to the appropriate file system instance; inform each file system of the portions of the data storage space within the system that can be used by that file system instance; identify data that should be moved from one file system instance to another in order to improve wear leveling or to balance the workload and reduce bottlenecks; update the distributed map to describe the mapping of data being moved from one file system to another; receive notification of data storage system configuration changes due to adding or removing system components (system upgrades), or due to the failure and replacement of components; identify data that should be moved from one file system to another, and any appropriate changes to the assignment of physical storage to file system instances; direct the file system instances to move data and adjust physical storage allocation to adapt to the configuration change, and update the distributed map as appropriate; determine when the storage system should be serviced to replace storage components that have failed, have reached their end of life, or are approaching end-of-life; and when machine service is required for other reasons, report those storage components that are approaching end-of-life, so that they can be replaced during the same service call, eliminating the cost of a subsequent service call.

Figure 3:
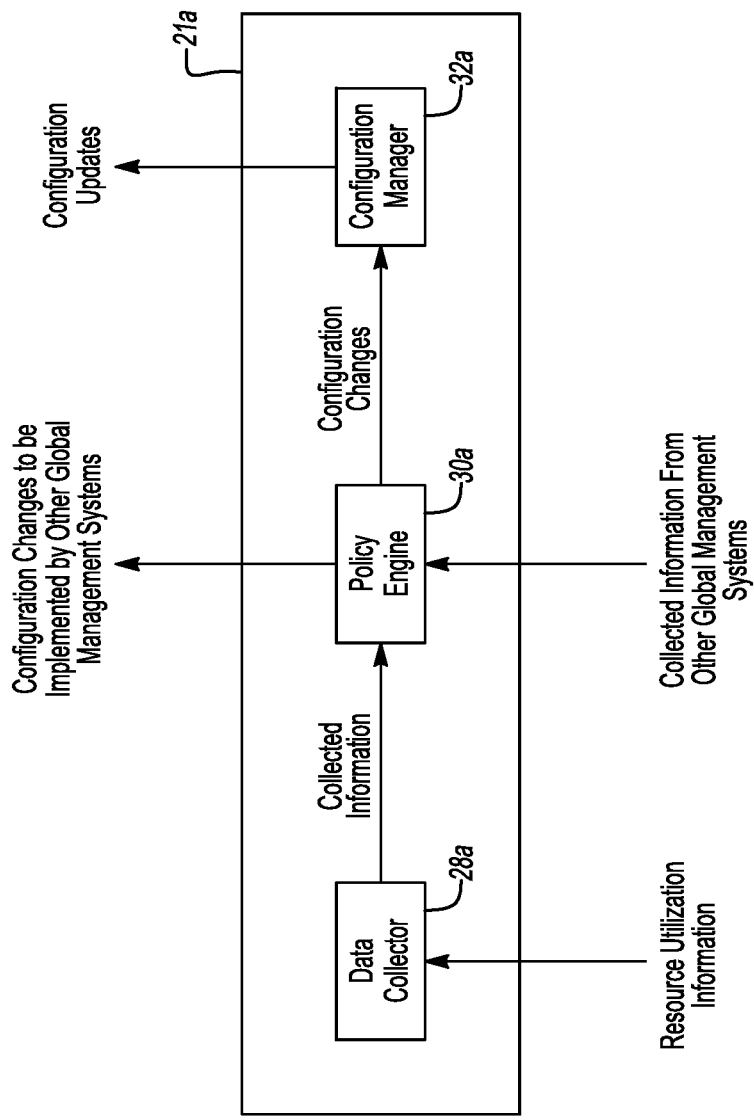
FIG. 3 is a block diagram depicting data flow in an embodiment of a global management system.

Referring now to FIGS. 1 and 3, an embodiment of the global management system 21*a* may include a data collector 28*a*, policy engine 30*a*, and configuration manager 32*a*. The data collector 28*a*, policy engine 30*a* and configuration manager 32*a* may be implemented in hardware/firmware/software/etc. or any combination thereof. The other global management systems 21*b*, etc. of FIG. 1 may be configured similarly to the global management system 21*a*. In certain embodiments, however, the policy engines 30*b*, etc. of these other global management systems 21*b*, etc. may be inactive as explained below.

Each of the respective data collectors 28*n* collect, in a known fashion, resource utilization information associated with the activities of the server 12*n* on which they are deployed. The data collector 28*a* may collect, for example, data storage wear rate, skew of the work load distribution, write activity, remaining lifetime, etc. This resource utilization information may be forwarded to (or requested by) one of the policy engines 30*n*.

In the embodiment of FIGS. 1 and 3, the policy engine 30*a* is active and serves as a master policy engine while the other policy engines 30*n* (e.g., 30*b*, etc.) are inactive. As a result, utilization information collected by the data collector 28*a* is forwarded to the policy engine 30*a*; utilization information collected by the data collector 28*b* is also forwarded to the policy engine 30*a*, etc. This scheme permits a single policy engine 30*a* to initiate configuration changes for the data storage system 10. Known techniques may be used for electing a single master policy engine 30*a* and distributing the results of such an election to the data collectors 28*n* that will be communicating with the elected master policy engine 30*a*. In other embodiments, utilization information collected by the data collector 28*b* may be forwarded to the data collector 28*a*, which then may be forwarded to the master policy engine 30*a*. Other scenarios are also possible.

The policy engine 30*a* may specify several wear rate and workload distribution policies as discussed above. An example policy may specify migrating data from one of the flash boards 22*n* (e.g., the flash board 22*a*) to another one or more of the flash boards 22*n* (e.g. flash boards 22*b* and 22*c*, flash boards in another storage unit, etc.) to enable removal of the flash board 22*a*. Another example policy may specify a maximum wear rate for the flash boards 22*n* that depends on a skew (or uniformity) of the work load distribution: the maximum wear rate may increase/decrease as the skew of the work load distribution increases/decreases. Yet another example policy may specify a maximum skew of the work load distribution that depends on the wear rate of the flash boards 22*n*: the maximum skew of the work load distribution may increase/decrease as the wear rate of the flash boards 22*n* increases/decreases. These example policies (or policies, for example, directed to the storage units, etc.) may allow the global management system 21*a* to sacrifice wear rate to improve the uniformity of the work load distribution, or sacrifice uniformity of the work load distribution to improve wear rate. If, for example, the work load distribution is generally uniform and the wear rate distribution across the flash boards 22*n* is non-uniform to the extent that prolonged operation with the anticipated workload and wear rate distributions may lead to premature wear out of the flash boards 22*n*, the global management system 21*a* may initiate a configuration change to cause the work load distribution to become less uniform so as to improve wear rate, etc. Conversely, if the wear rate distribution is generally uniform and the work load distribution is considerably non-uniform, the global management system 21*a* may allow the wear rate to become more non-uniformly distributed so as to improve the uniformity of the work load distribution.

In some embodiments, policy engine 30*a* may track historical trends in the data collected by the data collectors 28*n* and initiate a configuration change when justified by the magnitude of improvement in the data storage system 10 operation that the policy engine 30a anticipates will result from the configuration change. The policy engine 30a may balance the conflicting goals of, on the one hand, achieving a desired wear rate or workload distribution and, on the other hand, minimizing the impact to the data storage system 10 operations due to carrying out a configuration change.

Based on an evaluation of the collected information from the data collectors 28n, the current configuration of the data storage system 10, and in light of the polices in force, the policy engine 30a may initiate configuration changes for the data storage system 10. When configuration changes apply/affect/etc. portions of the data storage system 10 managed by one of the servers 12n, for example 12a, the configuration change requests may be directed to the corresponding configuration manager 32a.

The configuration managers 32n may implement the configuration changes initiated by the policy engine 30a so as to so control both the wear rate and work load distribution within the data storage system 10. For example, the configuration change may specify moving some frequently-written data from flash card 22a to flash cards 22b and 22c to reduce the wear rate of flash card 22a.

While embodiments of the invention have been illustrated and described, it is not intended that these embodiments illustrate and describe all possible forms of the invention. For example, while certain embodiments described herein were discussed within the context of ZFS, other embodiments may be implemented in different contexts such as a log-structured file system, a dynamically mapped data management system, etc. The words used in the specification are words of description rather than limitation, and it is understood that various changes may be made without departing from the spirit and scope of the invention.

What is claimed is:

1. A data storage system comprising:
    a plurality of server devices;
    a plurality of external interface providers each deployed on one of the server devices;
    a plurality of data storage controllers each deployed on one of the server devices, wherein each of the providers is configured to (i) receive a data access request, (ii) identify one of the controllers that can satisfy the request and (iii) forward the request to the identified controller; and
    a plurality of data storage units independent of the server devices, wherein the providers, controllers and units are in communication with each other as peers via a peer-to-peer interconnect fabric, and wherein each of the controllers (i) exclusively manages a portion of data content in at least one of the units and (ii) satisfies data access requests received from the providers by accessing the portion of data content in the at least one unit.

2. The system of claim 1 wherein at least one of the units is configured to buffer data contained in write data access requests to provide non-volatile storage of the data.

3. The system of claim 2 wherein at least another one of the units has a capacity greater than the at least one unit.

4. The system of claim 1 wherein the providers, controllers and units are in communication with each other via a remote direct memory access protocol.

5. The system of claim 1 wherein exclusively managing a portion of data content in at least one of the units includes performing copy-on-write.

6. The system of claim 1 wherein each of the controllers provides data redundancy for fault tolerance.

7. The system of claim 1 wherein accessing the portion of data content in the at least one unit includes retrieving the data content requested in the data access requests.

8. The system of claim 1 wherein accessing the portion of data content in the at least one unit includes storing data contained in the data access requests.

9. The system of claim 1 wherein all of the units provide non-volatile data storage.

10. A method of processing a data access request comprising:
    at an external interface provider deployed on a server device,
        receiving a data access request,
        identifying a data storage controller deployed on another server device that can satisfy the request, the identified controller exclusively managing a portion of data content in at least one data storage unit independent of the server devices, and
        forwarding the request to the identified controller via a peer-to-peer interconnect fabric; and
    at the identified controller,
        receiving the forwarded request, and
        accessing, in response to the received request, the portion of data content in the at least one unit to satisfy the request via the peer-to-peer interconnect fabric.

11. The method of claim 10 further comprising buffering data contained in write data access requests in the at least one unit to provide non-volatile storage of the data.

12. The method of claim 10 wherein exclusively managing a portion of data content in at least one data storage unit independent of the server devices includes performing copy-on-write.

13. A data storage system comprising:
    a plurality of server devices;
    a plurality of external interface providers each deployed on one of the server devices;
    a plurality of data storage controllers each deployed on one of the server devices, wherein each of the providers is configured to (i) receive a data access request, (ii) identify one of the controllers that can service the request and (iii) route the request to the identified controller; and
    a plurality of data storage units independent of the server devices, wherein at least one of the units is configured to buffer data contained in write data access requests to provide non-volatile storage of the data, wherein at least another one of the units has a capacity greater than the at least one unit, wherein the providers, controllers and units are in communication with each other as peers via a peer-to-peer interconnect fabric, and wherein each of the controllers is configured to (i) exclusively manage a portion of data content in at least one of the units, (ii) receive data access requests from the providers and (iii) access the portion of data content in the at least one unit in response to receiving the requests to service the requests.

14. The system of claim 13 wherein exclusively managing a portion of data content in at least one of the units includes performing copy-on-write.

15. The system of claim 13 wherein each of the controllers provides data redundancy for fault tolerance.

16. The system of claim 13 wherein accessing the portion of data content in the at least one unit includes retrieving the data content requested in the data access requests.

17. The system of claim 13 wherein accessing the portion of data content in the at least one unit includes storing data contained in the data access requests.

18. The system of claim 13 wherein all of the units provide non-volatile data storage.

* * * * *

UNITED STATES PATENT AND TRADEMARK OFFICE
CERTIFICATE OF CORRECTION

| | | |
|---|---|---|
| PATENT NO. | : 9,164,689 B2 | Page 1 of 1 |
| APPLICATION NO. | : 12/414084 | |
| DATED | : October 20, 2015 | |
| INVENTOR(S) | : O'Brien et al. | |

It is certified that error appears in the above-identified patent and that said Letters Patent is hereby corrected as shown below:

In the specification

Column 2, line 50, delete "systems" and insert -- systems. --, therefor.

Column 5, line 6, delete "1/0" and insert -- I/O --, therefor.

Column 11, line 9, delete "polices" and insert -- policies --, therefor.

Signed and Sealed this
Seventh Day of June, 2016

Michelle K. Lee
*Director of the United States Patent and Trademark Office*